United States Patent Office 3,767,610
Patented Oct. 23, 1973

3,767,610
THERMOPLASTIC MOLDING COMPOSITIONS ON THE BASIS OF POLYOXYMETHYLENES
Karlheinz Burg, Langenhain, Taunus, and Ludwig Brinkmann and Ernst Wolters, Frankfurt am Main, Germany, assignors to Farbwerke Hoechst Aktiengesellschaft vormals Meister Lucius & Bruning, Frankfurt am Main, Germany
No Drawing. Filed Nov. 24, 1971, Ser. No. 202,021
Claims priority, application Germany, Nov. 26, 1970,
P 20 58 126.4
Int. Cl. C08g 51/04
U.S. Cl. 260—37 AL                        4 Claims

ABSTRACT OF THE DISCLOSURE

The invention relates to thermoplastic molding compositions on the basis of polyoxymethylenes containing boron nitride as a nucleating agent in amounts of from 0.0005 to 0.04% by weight, relative to the total mixture, and the production of shaped articles with improved properties therefrom.

---

The present invention relates to thermoplastic moulding compositions on the basis of polyoxymethylenes (POM).

It is known that polyoxymethylenes have a strong tendency to crystallize. Even if the melt is undercooled to a small extent only, a rapid growth of spherulites is observed which, in most cases, are much larger than the length of light waves and confer upon the material a considerable opacity. Moreover, owing to the crystallization process a great number of microscopically small fissures and internal tensions are formed in the interior and on the surface of the material. These fissures and internal tensions detrimentally affected the mechanical properties of shaped articles, for example injection moulded articles, made from polyoxymethylenes. The aforesaid flaws are the more pronounced the larger the individual spherulites.

It is also known that by adding 0.0001 to 0.5% by weight of talc to polyoxymethylenes of high molecular weight and uniformly distributing the said inorganic nucleating agent in the organic polymer, the crystal structure of injection moulded articles can be rendered more uniform and hence a structure of coarse spherulites having an average diameter of 100 microns can be transformed into a homogeneous structure in which the spherulites have a diameter of 4 to 8 microns (cf. British Pat. No. 1,133,490). The aforesaid data relate to injection moulded articles which have been crystallized under pressure at a temperature in the range of from 50° to 100° C.

Furthermore, it is known that boron nitride can be used as nucleating agent for polymer products, for example polyoxymethylenes, when it is mixed with the polymer in amounts of from 0.05 to 10% by weight (cf. U.S. Pat. No. 3,261,800).

It has also been proposed (in copending application Ser. No. 60,722) to prepare thermoplastic molding compositions on the basis of polyoxymethylenes having a reduced specific viscosity of from 0.07 to 2.5 dl.g.$^{-1}$ and a crystallite melting point of from 150° to 180° C. and containing an amount of from 0.0005 to 1.0% by weight, relative to the total mixture, of an inorganic nucleating agent, wherein the polyoxymethylene spherulites formed in the isothermal crystallization of the moulding composition at 150° C. under a pressure of 1 atmosphere have a diameter in the range of from 30 to 250 microns.

The subject of the present invention is a further improvement of the aforementioned thermoplastic moulding compositions which comprises the use of boron nitride as inorganic nucleating agent, said boron nitride being used in amounts of from 0.0005 to 0.04, preferably from 0.001 to 0.02% by weight, relative to the total mixture.

The boron nitride used in accordance with the invention is prepared according to known methods. Tempering of the boron nitride at temperatures of from 800° C. to the sublimation temperature of the boron nitride is advantageous.

The particle diameter of boron nitride mostly is in the range of from 0.1 to 10 microns, preferably from 1 to 5 microns.

The molding compositions of the invention are suitably produced by first mixing polyoxymethylene powder in a high speed mixer (about 1,000 to 2,000 revolutions per minutes) with the commonly used stabilizers against oxidation, heat and the action of light, and the inorganic nucleating agent and then transforming the mixture into granules on an extruder at a temperature in the range of from 140° to 240° C., preferably 170° to 220° C.

Polyoxymethylenes in the sense of the present invention are home- and copolymers of formaldehyde or a cyclic oligomer of formaldehyde, preferably trioxan. By homopolymers there are to be understood those polymers of formaldehyde or a cyclic oligomer of formaldehyde the terminal hydroxyl groups of which have been stabilized aginst degradation by chemical reaction, for example esterification or etherification.

As polyoxymethylenes there are suitably used copolymers of trioxan and cyclic ethers having 3 to 5 ring members, preferably epoxides, and/or cyclic acetals having 5 to 11 ring members, preferably 5 to 8 ring members, and/or linear polyformals, for example polydioxolane.

Suitable comonomers for trioxan are, above all, compounds of the following formula

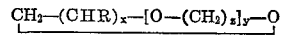

in which R represents a hydrogen atom, an aliphatic alkyl radical having 1 to 6, preferably 1 to 3, carbon atoms, or a phenyl radical, $x$ is an integer of from 1 to 3 when $y$ is zero, $y$ is an integer of from 1 to 3 when $x$ is zero and $z$ is 2, and $z$ is an integer in the range of from 3 to 6, preferably 3 or 4, when $x$ is zero and $y$ is 1.

As cyclic ether ethylene oxide is especially suitable; styrene oxide, propylene oxide and epichlorohydrin are also suitable.

Especially suitable cyclic acetals are glycol formal (1,3-dioxolane), butanediol-formal (1,3-dioxepane), and diglycol formal (1,3,6-trioxocane). 4-chloromethyl-1,3-dioxolane and hexanediol formal (1,3-dioxonane) are also suitable.

The trioxane copolymers are stabilized against thermal decomposition by hydrolytic degradation to terminal primary alcohol groups.

When mixing the components of the moulding compositions of the invention, stabilizers against the action of heat, oxygen and light may be added. Suitable heat stabilizers are, for example, polyamides, amides of polybasic carboxylic acids, amidines, hydrazines, ureas and poly(N-vinyl-lactams). As oxidation stabilizers phenols, especially bisphenols, and aromatic amines are used and suitable stabilizers against the action of light are derivatives of α-hydroxy-benzophenone and of benzotriazole, the stabilizers being used in an amount of from 0.1 to 10% by weight, preferably 0.5 to 5% by weight, calculated on the total mixture.

Shaped articles made from the polyoxymethylene compositions nucleated in accordance with the invention have a better ball indentation hardness and stiffness in torsion than shaped articles made from polyoxymethylenes which do not contain a nucleating agent. Moreover, they have a much higher impact strength, determined by a drop test. Shaped articles made from polyoxymethylene compositions in which the size of the spherulites is below 30 microns or above 250 microns have only a little improved impact strength, as compared with articles made from polyoxymethylenes which have not been nucleated according to the invention, while articles made from a composition in which the polyoxymethylene spherulites have a size of from 30 to 250 microns have a substantially improved impact strength.

The moulding composition of the invention can be comminuted mechanically, for example by chopping or grinding, into granules, chips, flakes or powders, and processed in the thermoplastic state, for example by injection moulding or extrusion, into shaped articles, for example bars, rods, sheets, films, ribbons and tubes.

The following examples illustrate the invention, the percentages being by weight unless otherwise stated.

EXAMPLE (a) A copolymer of 98% of trioxan and 2% of ethylene oxide, having a density of 1.41 g.ml.$^{-1}$, a reduced specific viscosity of 0.70 dl.g.$^{-1}$, a melt index of 9.0 g./10 min. and a crystallite melting point of 165° C. was mixed with 0.5% of bis(2-hydroxy-3-tert-butyl-5 - methylphenyl)-methane and 0.1% of dicyanodiamide and varying amounts of boron nitride and the mixture was homogenized at 200° C. on a single screw extruder. The residue time in the cylinder was about 4 minutes. The nucleating agent had the following particles size distribution:

| | Percent |
|---|---|
| 1 micron and less | 39 |
| 2 microns | 37 |
| 3 microns | 15 |
| 4 microns | 3 |
| 5 microns and more | 6 |

(b) To determine the size of the spherulites in the products obtained films having a thickness of about 10 microns were prepared from the respective polyoxymethylene granules by melting them at 180° C. between two glass plates under a pressure of 200 kp.cm.$^{-2}$ with subsequent crystallization at 150° C. at atmospheric pressure, which films were examined under the microscope.

Furthermore, sheets of dimensions 60 x 60 x 2 millimeters were made from the granules by injection moulding at a temperature of the composition of 200° C. and a temperature of the mould of 80° C., which sheets were subjected to a drop test to determine the impact strength. For this purpose a sheet clamped in a frame was subjected to impact by allowing a hammer having a definite weight to fall onto the sheet from different heights. As a measurement for the impact strength there is given the height which is sufficient for the hammer to break 50% of the sheets (average value from 40 drop tests).

The reduced specific viscosity (RSV) of the polyoxymethylenes used according to the invention was measured at 140° C. in a solution of the polymer in butyrolactone with addition of 2% of diphenylamine, the concentration being 0.5 g./100 ml.

The density was measured according to DIN (German Industrial Standards) 53,479.

The melt index was determined according to DIN 53,-735 at 190° C. under a load of 2.16 kg.

The ball indentation hardness was determined according to VDE (Verband Deutscher Elektrotechniker) 0302 on injection moulded specimens with a time of load of 10 seconds.

The stiffness in torsion was measured according to DIN 53,447 with moulded plates having a thickness of 2 millimeters at a temperature of 120° C. with a time of load of 60 seconds.

The mechanical properties of polyoxymethylene which had not been nucleated and polyoxymethylene nucleated according to the invention are indicated in the following table.

The results listed in the table show the superiority of the moulding compositions of the invention (see Examples 1 to 6) which is expressed above all by the impact strength values obtained in in the drop test.

TABLE

| Example | Content of boron nitride (percent by weight) | Size of spherulites (microns) | Height drop (cm.) | Ball indentation hardness (kp./cm.$^2$) | Stiffness in torsion (kp./cm.$^2$) |
|---|---|---|---|---|---|
| A | | 621 | 14 | 1,430 | 1,360 |
| B | 0.050 | 23 | 89 | 1,470 | 1,640 |
| C | 0.100 | 17 | 43 | 1,475 | 1,670 |
| D | 0.200 | 12 | 31 | 1,480 | 1,650 |
| E | 0.300 | 13 | 25 | 1,475 | 1,650 |
| F | 0.400 | 14 | 23 | 1,475 | 1,670 |
| G | 0.500 | 13 | 21 | 1,480 | 1,670 |
| 1 | 0.0005 | 152 | 125 | 1,445 | 1,560 |
| 2 | 0.001 | 106 | 186 | 1,445 | 1,540 |
| 3 | 0.005 | 76 | 229 | 1,455 | 1,610 |
| 4 | 0.010 | 43 | 232 | 1,460 | 1,670 |
| 5 | 0.015 | 38 | 182 | 1,470 | 1,630 |
| 6 | 0.025 | 32 | 154 | 1,465 | 1,640 |

We claim:

1. A thermoplastic molding composition based on polyoxymethylenes having a reduced specific viscosity of from 0.07 to 2.5 dl.g.$^{-1}$ and a crystallite melting point of from 150° to 180° C. and containing from 0.0005 to 0.04% by weight, based on the total weight of the composition, of an inorganic nucleating agent which is boron nitride, said composition being characterized by the fact that the polyoxymethylene spherulites formed in the isothermal crystallization of the composition at 150° C. under a pressure of one atmosphere have a diameter of from 30 to 250 microns.

2. Thermoplastic moulding compositions on the basis of polyoxymethylenes as claimed in claim 1, wherein boron nitride is used in an amount of from 0.001 to 0.02% by weight, relative to the total mixture.

3. Thermoplastic molding compositions as claimed in claim 1, wherein the particle diameter of boron nitride mostly is in the range of from 0.1 to 10 microns.

4. Thermoplastic molding compositions as claimed in claim 1, wherein the particle diameter of boron nitride is in the range of from 1 to 5 microns.

References Cited

FOREIGN PATENTS 1,133,490  11/1968  Great Britain _____ 260—37 AL
1,104,089  2/1968  Great Britain _____ 260—40

OTHER REFERENCES

Shell: Crystalline Linear Polyesters, "Chemical Abstracts," vol. 68, 1968, 50560g.

LEWIS T. JACOBS, Primary Examiner

U.S. Cl. X.R.

260—67 FP